United States Patent [19]

McPherson et al.

[11] Patent Number: 4,854,564
[45] Date of Patent: Aug. 8, 1989

[54] POWER CLAMP WITH TRACK WIPER

[75] Inventors: Alexander W. McPherson, Farmington Hills; Larry M. Witt, Rochester, both of Mich.

[73] Assignee: Delaware Capital Formation, Inc., Wilmington, Del.

[21] Appl. No.: 237,441

[22] Filed: Aug. 29, 1988

[51] Int. Cl.⁴ ............................ B23Q 3/03; B25B 1/04
[52] U.S. Cl. .................................................... 269/32
[58] Field of Search ...................... 269/32, 27, 24, 285, 269/239, 228, 91, 93, 94; 384/15

[56] References Cited

U.S. PATENT DOCUMENTS 4,163,591 8/1979 Hennig et al. ........................ 384/15
4,458,889 7/1984 McPherson et al. ................. 269/32

Primary Examiner—Robert C. Watson
Attorney, Agent, or Firm—Lloyd M. Forster

[57] ABSTRACT

Power clamp with track wiper for protecting anti-friction roller bearings running in close fitting reaction tracks from buildup of powdery substance encountered on certain welding conditions which is carried by the atmosphere and clings to the bearing track leading to eventual binding after prolonged reciprocation. The track wiper is carried on the bearing shaft with loose-fitting relation to each roller bearing but with close scraping relation to the bearing track surfaces.

5 Claims, 1 Drawing Sheet

POWER CLAMP WITH TRACK WIPER

BACKGROUND OF THE INVENTION

Applicant's prior U.S. Pat. No. 4,458,889 issued on July 10, 1984 discloses a locking power clamp wherein highly pressurized needle bearings in straight track portions of the clamp actuate links connected to a pivoted clamp arm.

Customers of De-Sta-Co Division, Dover Resources Inc., assignee of said patent, have reported that certain conditions such as welding may create an atmosphere having substance which clings to the clamp components. This substance sometimes lands on the bearing tracks and is picked up by the rolling bearings. As the bearings continue to roll back and forth they may pick up more material on their diameters (snowball effect) and eventually stop further roller travel.

Attempts have been made to cover the track area with tape, as disclosed in said patent, or with boots to prevent buildup, which have not always completely or most effectively solved this particular problem.

Shaft wipers are known in the art as well, as slide wipers, generally made of rubber or felt materials; but no such known prior art would be entirely suitable for solving the roller buildup problem in the tracks of the power toggle clamp in question.

BRIEF SUMMARY OF THE PRESENT INVENTION

The present solution comprises a rectangular steel block having a close sliding fit with each rectangular roller track. The block is recessed at its lower end with an arcuate pocket of somewhat greater radius than the bearing radius. The roller fits with substantial radial clearance within such pocket and the bearing shaft extends through a clearance hole in the outer wall of the scraper block to provide an operating assembly.

DETAILED DESCRIPTION OF PREFERRED EMBODIMENT

Figure 1:
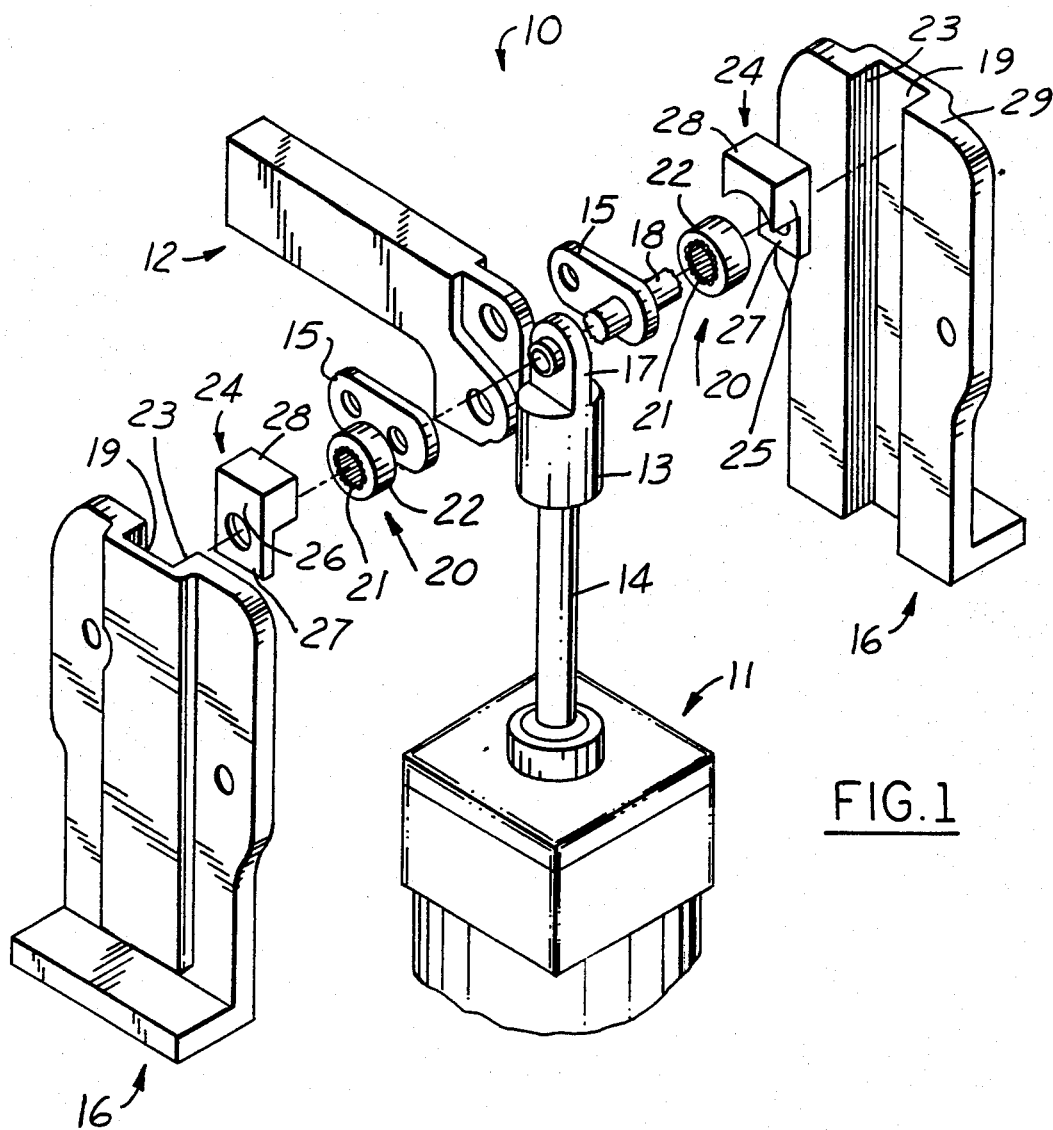
FIG. 1 is an exploded view of the power clamp illustrated in said prior patent showing the track wipers added thereto.

With reference to FIG. 1, the power clamp of the present invention comprises clamp head 10 actuated by power cylinder 11 adapted to move 90° clamp arm 12 through coupling 13, piston rod 14 and links 15, to a clamping position relative to any base or work table to which the clamp head may be secured by two symmetrically forged integrally connected body halves 16.

Linkage for actuating clamp arm 12 through piston rod 14 includes coupling 13 having reduced end 17 extending between links 15 connected thereto by shaft 18, shown in fragmentary broken form, but extending through to the inside extremities 19 of the guide tracks in body halves 16 and forming the inner race for spaced needle bearings 20 having needles 21 and perimeter surface 22 engaging longitudinal slot track surfaces 23 in each of the forged halves 16 of clamp head 10.

Figure 2:
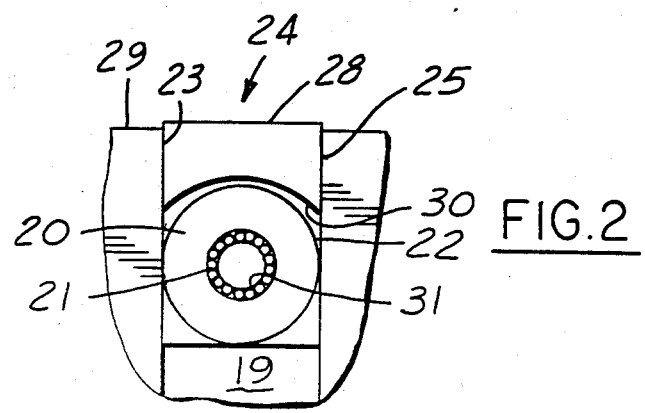
FIG. 2 is a fragmentary axial view of the bearing wiper end track illustrating the relative geometric relationship.

With additional reference to FIG. 2, a pair of track wipers 24 each has side surfaces 25 fitting closely within track surfaces 23, back surface 26 engaging track surface 19; apertured extension 27 engaged by shaft 18; top surface 28 projecting slightly above the upper end 29 of forging half 16; and arcuate bearing cover 30 extending over bearing 20 with substantial clearance therebetween as well as between shaft 18 and aperture 31 in extension 27.

Construction of track wipers 24 permits them to float with some lost motion relative to bearings 20 in following track surfaces 23 while scraping any deposit above the top surface of forging 16. This has been found preferable to earlier embodiments of the present invention where the arc 30 was formed in close proximity to bearing surface 22 in an attempt to provide secondary scraping action at the perimeter surface 22 of each bearing.

We claim:

1. Power clamp means comprising clamp base means provided with reaction guide track means, said base means being constructed with two pieces secured in parallel facing relation, each piece having a straight rectangular cross section reaction guide track with its facing side open extending to an open end of each base piece, track follower means, clamp arm means pivotally connected to said base means, actuating linkage means having spaced pivots respectively confined to said guide track means by said track follower means and having an actuating connection with said clamp arm means, coupling means adapted for connection to a reciprocable power source for actuating said track follower means along said track means and, through said linkage means, to provide pivotal movement of said arm means to respective clamp and release positions, stop means limiting said movement to a locked clamping position of said linkage means, said track follower means including anti-friction bearing means with a cylindrical rolling element for engaging each of said guide tracks with close perimeter clearance relation, said stop means limiting the travel of each rolling element when said lock clamping position is reached to a position spaced from said open end of said track, said rolling element being narrower in width than depth of its guide track, a bearing shaft extending through and beyond said rolling element, track wiping means mounted on said extending shaft, said wiping means having a rectangular track scraping portion substantially equal in cross-section to said rectangular track cross-section substantially filling the space beyond said rolling element at the extremity of its travel, said wiping means having a projection from said rectangular portion for engaging said extending shaft in clearance space of said track beyond said rolling element.

2. Power clamp of claim 1 wherein said rectangular portion of said wiping means extends above the end of said track when said locked clamping position is reached.

3. Power clamp of claim 1 wherein said rectangular portion of said wiping means extends with substantial clearance relative to the radial perimeter of the rolling element.

4. Power clamp of claim 3 wherein said clearance is in the form of an arc having a substantially greater radius than the perimeter of said rolling element.

5. Power clamp of claim 4 wherein the mounting of said wiper means on said shaft includes substantial radial clearance to permit the surface of said wiping element to follow the surface of said guide track without binding.

* * * * *